United States Patent
Niemeyer et al.

(10) Patent No.: US 8,393,156 B2
(45) Date of Patent: Mar. 12, 2013

(54) VARIABLE PERFORMANCE VALVE OF A FUEL NOZZLE FOR A TURBINE ENGINE

(75) Inventors: Nathan Niemeyer, Roscoe, IL (US); Charlie Carson, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 529 days.

(21) Appl. No.: 12/614,567

(22) Filed: Nov. 9, 2009

(65) Prior Publication Data
US 2011/0107768 A1  May 12, 2011

(51) Int. Cl.
*F02C 1/00* (2006.01)
*F16K 21/10* (2006.01)
*F16K 31/18* (2006.01)
*F04B 49/00* (2006.01)

(52) U.S. Cl. ........... 60/741; 60/739; 60/740; 137/514.3; 137/538; 137/541; 239/410; 417/300

(58) Field of Classification Search .............. 60/739, 60/740, 741, 776; 137/494, 514.3, 538, 541; 239/407, 408, 409, 410, 411; 251/127; 417/279, 417/300
See application file for complete search history.

(56) References Cited

U.S. PATENT DOCUMENTS

| | | | | |
|---|---|---|---|---|
| 2,704,035 A | * | 3/1955 | Bader | 417/504 |
| 2,795,106 A | * | 6/1957 | Martin | 60/39.37 |
| 2,989,975 A | * | 6/1961 | Gartner | 137/115.1 |
| 3,726,088 A | * | 4/1973 | Kretschmer et al. | 60/741 |
| 4,586,536 A | * | 5/1986 | Karmel | 137/599.08 |
| 4,825,649 A | | 5/1989 | Donnelly et al. | |
| 4,962,889 A | | 10/1990 | Halvorsen | |
| 5,497,801 A | * | 3/1996 | Kusunose et al. | 137/115.04 |
| 5,544,480 A | * | 8/1996 | Edwards | 60/243 |
| 5,918,628 A | | 7/1999 | Harding | |
| 6,135,135 A | | 10/2000 | Futa, Jr. et al. | |
| 6,390,053 B2 | * | 5/2002 | Gillis et al. | 123/267 |
| 7,007,476 B2 | | 3/2006 | Mains et al. | |
| 7,032,876 B1 | * | 4/2006 | Pedersen et al. | 251/63.4 |
| 2004/0154302 A1 | * | 8/2004 | Wernberg et al. | 60/739 |
| 2009/0293492 A1 | * | 12/2009 | Tentorio | 60/772 |
| 2010/0037961 A1 | * | 2/2010 | Tysver et al. | 137/115.13 |

FOREIGN PATENT DOCUMENTS

| | | |
|---|---|---|
| JP | 07-259687 A | 10/1995 |
| JP | 10-047084 A | 2/1998 |
| JP | 2005-105923 A | 4/2005 |

* cited by examiner

*Primary Examiner* — Ehud Gartenberg
*Assistant Examiner* — Michael B Mantyla
(74) *Attorney, Agent, or Firm* — Reinhart Boerner Van Deuren P.C.

(57) ABSTRACT

A variable performance valve for use in a fuel nozzle is presented. The valve includes a spring, an inner spool having a port, an outer sleeve, and an orifice, which in a fuel nozzle application may be a calibration orifice. In a low flow condition, the inlet to downstream pressure is the spring force divided by the area on which the pressure acts. At low flow the orifice does not cause any appreciable pressure drop. As the flow increases, a pressure drop develops across the orifice. Since the pressure drop across the valve cannot be greater than the spring force divided by valve area, the valve is forced to open to compensate. As flow is increased, the valve will stroke completely open and the pressure drop at the port becomes negligible and the pressure drop across the orifice is nearly 100% of the pressure drop across the valve.

12 Claims, 3 Drawing Sheets

VARIABLE PERFORMANCE VALVE OF A FUEL NOZZLE FOR A TURBINE ENGINE

FIELD OF THE INVENTION

This invention generally relates to pressurizing, metering, and check valves, and more particularly to pressurizing, metering, and check valves for use in fuel nozzles for turbine engines.

BACKGROUND OF THE INVENTION

In most operating conditions on a turbine engine, it is desirable to have every fuel nozzle flow an equal amount of fuel. Reducing nozzle to nozzle flow variation enables better control of local fuel-to-air ratios in the combustor and allows for uniform temperature distribution at the inlet to the turbine stage. Uniform fuel flow from nozzle to nozzle is accomplished by calibrating the nozzle's flow number (FN) at a key operating condition. The pressure drop of the nozzle is adjusted to be in a narrow range at a known flow. In most applications, the calibration point tends to be at a high flow, where the accuracy of flow from nozzle to nozzle is most critical.

Nozzle calibration is accomplished by adjusting the pressure drop of a flow restriction in the nozzle, which is typically in series with the tip restriction of the nozzle. This adjustable flow restriction in the nozzle is referred to as the calibration orifice. All nozzle flow typically passes through the calibration orifice and then the tip, which combine to give the nozzle its high-flow pressure drop characteristic.

By using the calibration orifice calibrated at high flow, the design challenge then becomes controlling flow of the fuel nozzle at low flow conditions. At low flow, the pressure drop in the nozzle can be very small and subject to variations caused by, e.g., check valves, head effect of the manifold, and other variations. Pressurizing valves (also known as metering valves) are used to keep small variations between nozzles from turning in to large percentage flow variations at low flows. The metering valve does this by controlling the relationship between pressure rise and nozzle flow rate; the flow number of the valve is small at lower flows and increases as flow increases. A functional schematic illustration of such a conventional fuel nozzle 101 having a metering valve 103 is shown in FIG. 5.

As will be recognized by those skilled in the art, the conventional metering valve 103 includes a valve spring 105, an inner spool 107, and an outer sleeve 109. Fuel enters the metering valve manifold 111 through ports 113. As the inlet fuel pressure exceeds the spring force acting on inner spool 107, the inner spool 107 begins to stroke to the right as shown in FIG. 5. As the inner spool 107 moves to the right in relation to outer sleeve 109, it opens metering port 115, which then allows fuel to flow through the orifice 117 and the tip restriction 119 and into the combustor.

In such conventional nozzles 101, the metering valve 103 is always in regulation. This means that it is always balancing the spring force of the valve against the pressure drop of the valve. Thus, such conventional metering valves 103 are always adding pressure drop to the nozzle 101, even at high flow, as may be seen from an examination of the graphical illustration of FIG. 6. In this graph, trace 121 illustrates the pressure drop across metering port 115, trace 123 illustrates the pressure drop across the calibration orifice 117 and the tip restriction 119, and trace 125 illustrates the percentage of total pressure drop across the fuel nozzle 101 that is allocated to the metering port 115. As may be seen, the pressure drop across the metering port 115 (trace 121) is fairly constant over the entire nozzle flow range, i.e. it continues to add pressure drop to the nozzle 101, even at high flows. While the pressure drop of the valve 103 is key to operation at low flow, it is not required at high flow. In fact, the additional pressure drop of the metering valve 103 (see trace 121) adds variation to the precisely calibrated performance of the nozzle 101, thus increasing the flow variation from nozzle to nozzle (compared to a nozzle with no valve) at high flow rates.

It is desired, therefore, for a pressurizing valve for use in a nozzle that is able to work normally (variable FN) at low flow, without adding additional variation to the critical calibrated high flow of the nozzle. The invention provides such a valve. These and other advantages of the invention, as well as additional inventive features, will be apparent from the description of the invention provided herein.

BRIEF SUMMARY OF THE INVENTION

In view of the above, embodiments of the present invention provide a new and improved valve that overcomes one or more of the problems existing in the art. More particularly, embodiments of the present invention provide a new and improved valve for use, e.g., in a fuel nozzle. Still more particularly, embodiments of the present invention provide a valve that is configured to control flow at low flow rates while minimizing the effect of the valve at high flow rates. Still more particularly, embodiments of the present invention provide a valve that is configured to provide pressurizing, metering, and/or checking functions to control flow at low flow rates while minimizing the effect of the valve at high flow rates In one embodiment the variable performance valve includes a spring, an inner spool, and an outer sleeve. A port is provided in the spool such that, as the valve begins to stroke, the port area that is open to flow increases. The flow also is directed to an orifice that, in environments such as fuel nozzles, is used to calibrate the nozzle at high flow conditions. The port accounts for a majority of the pressure drop across the valve during low flow conditions. As flow is increased, a pressure drop across the orifice begins to have an effect on the positioning of the valve. Indeed, during high flow conditions the pressure drop across the valve becomes almost entirely a result of the pressure drop across the orifice. This pressure drop helps pull the valve open to increase the port area, thereby minimizing the differential pressure of the valve port.

In an alternate embodiment, a channel and an additional port communicating fluid pressure to the backside of the inner valving spool member downstream of the orifice is provided. Pressure drop across the valve is controlled almost entirely by the variable area port during low flow conditions, and governed almost entirely by the orifice during high flow conditions. Such configurations may utilize a orifice in parallel with the valve, or may include the orifice along an axis of the valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
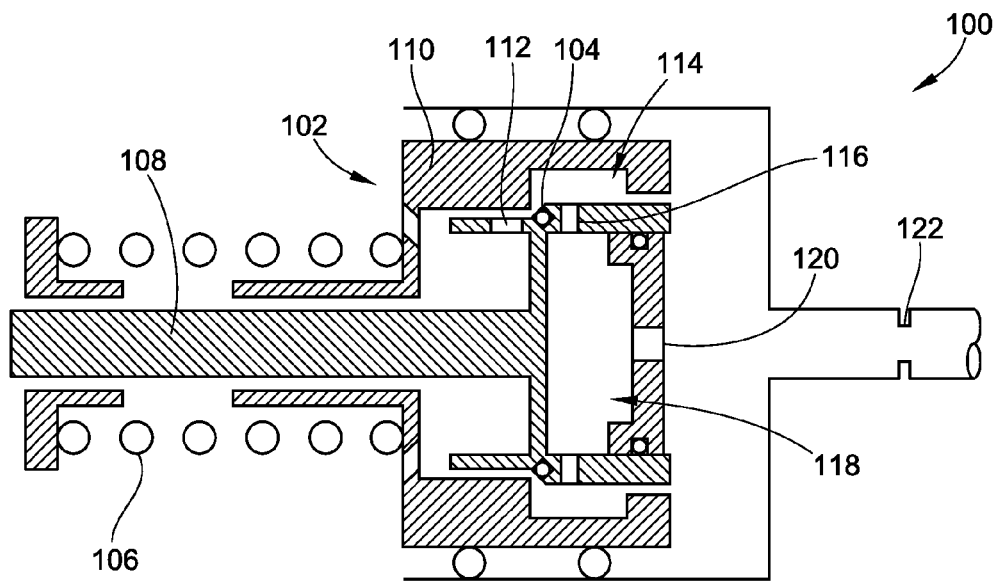
FIG. 1 is a functional schematic illustration of an embodiment of a variable performance valve used in a fuel nozzle constructed in accordance with the teachings of the present invention.

Turning now to the Drawings, there is illustrated in FIG. 1 a fuel nozzle 100 including a variable performance valve 102 particularly well suited for application in a turbine engine. However, while the following description will utilize such an exemplary environment in describing various features and functionality of embodiments of the present invention, such description should be taken by way of example and not by way of limitation. Indeed, advantages of embodiments of this invention can be used to improve a variety of valve types, such as valves that only check flow, valves that only meter flow, or valves that may do both functions, for a variety of operating environments and applications.

As illustrated in FIG. 1, a fuel nozzle 100 for use in a turbine engine (not shown) utilizes an embodiment of the variable performance valve 102 constructed in accordance with an embodiment of the present invention. The valve 102 may, or may not, include a seal 104 to check or prevent fuel flow at shut down. The valve 102 includes a spring 106, an inner spool or piston 108, and a fixed outer sleeve 110. A port 112 is arranged in relation to an annulus 114 of the outer sleeve 110 to act as a variable area based on the stroke of the valve 102, i.e. the position of the outer sleeve 110 in relation to the movement of the inner spool 108. This port 112 allows the fuel flow to pass through the valve 102 once opened. As illustrated, the fuel flows through port 112, into annulus 114, through a second port 116, and into a fuel valve manifold 118. The fuel flows through an orifice 120 (which may be the nozzle's calibration orifice in the illustrated operating environment) to create an additional pressure drop. The fuel then flows through the nozzle tip restriction 122 and into the combustion chamber of the turbine engine.

When the inlet pressure of the fuel to the fuel nozzle 100 increases enough to overcome the spring 106 preload on the inner spool 108, the valve 102 starts to open, i.e. the inner spool 108 moves to the right as pictured in FIG. 1, and fuel starts to flow. In this very low flow condition, the inlet to downstream pressure of the valve 102 is the initial spring force divided by the area of the spool 108 on which the pressure acts. Flow passes through the ports 112, 116 and also through the orifice 120. However, at this very low flow condition, the orifice 120 does not cause any appreciable pressure drop based on its relative size compared to the area of opening of port 112. Thus the pressure differential on the valve 102 is essentially equal to the pressure differential at the port 112 (port 116 being sized not to add appreciable pressure drop to the valve 102).

As the inlet pressure increases, the valve 102 strokes open further, opening the port 112 to a larger area. This larger area allows more flow to pass. As the flow through the orifice 120 increases, a pressure drop develops across it. The pressure drop across the valve 102 is now a sum of the port 112 pressure drop and the orifice 120 pressure drop. Since the pressure drop across the valve 102 cannot be greater than the spring force divided by valve area, the valve 102 is forced to stroke open to reduce the port 112 pressure drop (by increasing flow area) to compensate for increasing orifice 120 pressure drop.

As flow is further increased, the valve 102 will stroke all the way open (preferably to a positive stop) such that the pressure drop at the port 112 becomes negligible and the pressure drop across the orifice 120 approaches 100% of the pressure drop across the valve 102. In this way, the additional pressure drop across the orifice 120 helps pull the valve 102 open.

Figure 5:
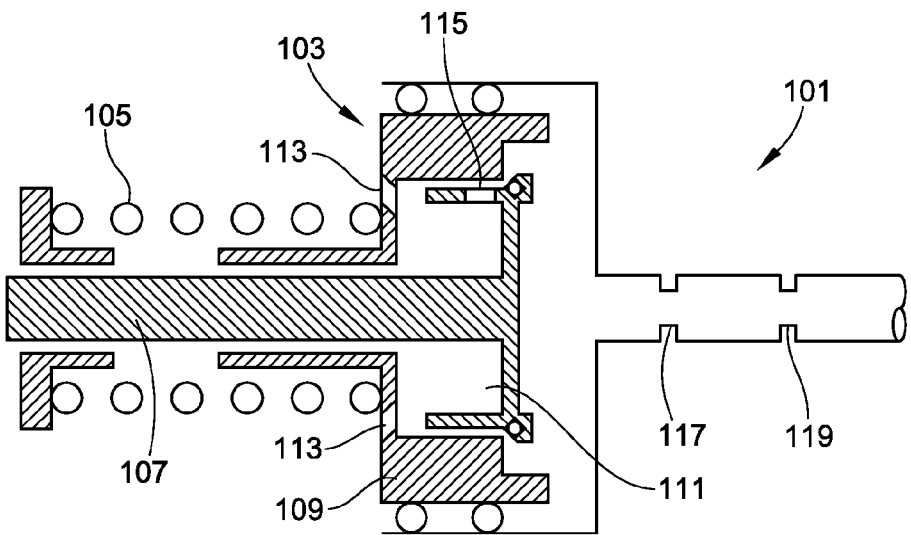
FIG. 5 is a functional schematic illustration of a conventional metering valve used in a fuel nozzle.
Figure 6:
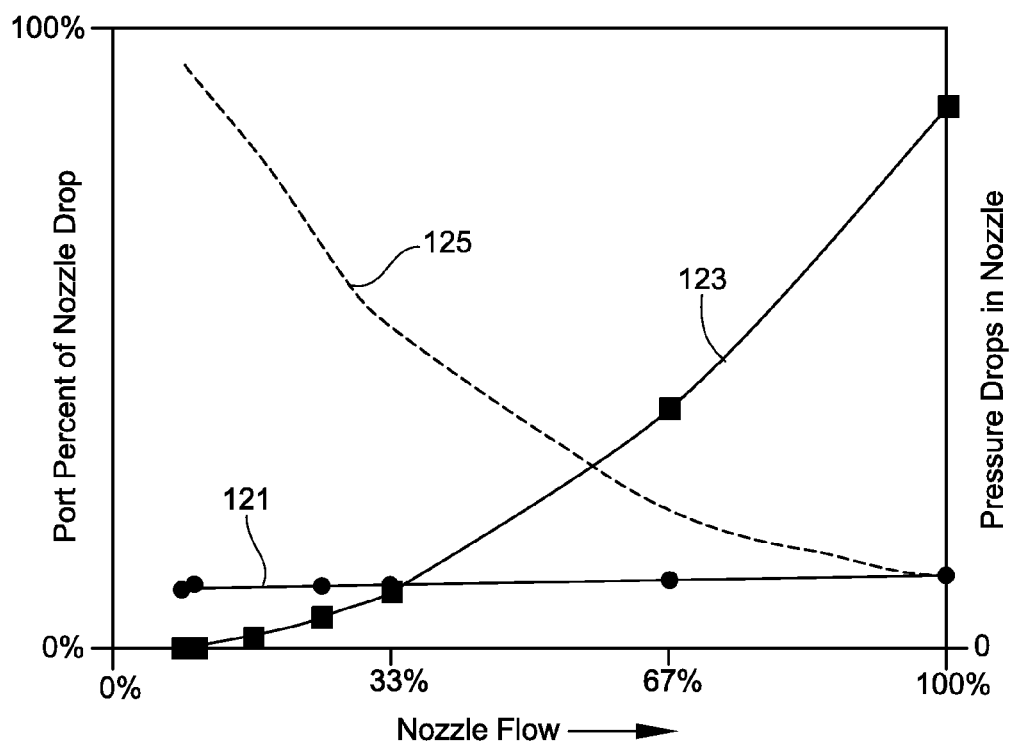
FIG. 6 is a graphical illustration of pressure drops of various orifices within the metering valve illustrated in FIG. 5.

When considering flow variation out of a conventional fuel nozzle 101 (see FIG. 5) utilizing a conventional metering valve 103, at very low flow the valve 103 variation dominates nozzle performance as shown by trace 125 of FIG. 6. At moderate flow, the valve 103 and the tip 119 and trim 117 restrictions combine, based on their respective pressure drops. And at high flows, the tip restriction 119 and calibration orifice 117 are dominant as shown by trace 123, but the valve 103 pressure drop is still present and adds tolerance to the flow performance due, e.g. to variations in spring force, etc. in the valve 103. This continued effect from the valve port 115 may be seen in FIG. 6 by the nearly constant pressure drop illustrated by trace 121. As discussed above, this valve 103 pressure drop at high flows adds to the nozzle-to-nozzle variation in the turbine engine, which is undesirable.

Functionally, and unlike the conventional metering valve 103, the operation of the variable performance valve 102 uses the orifice 120 pressure drop to pull the valve 102 open during high flow conditions, resulting in a port position independent of port pressure drop and such that the port 112 pressure drop is not significant. This change in nozzle flow dependence from low to high flow conditions may be graphically seen from an analysis of FIG. 2 and a comparison with the performance of the conventional metering valve 103 shown in FIG. 6.

Figure 2:
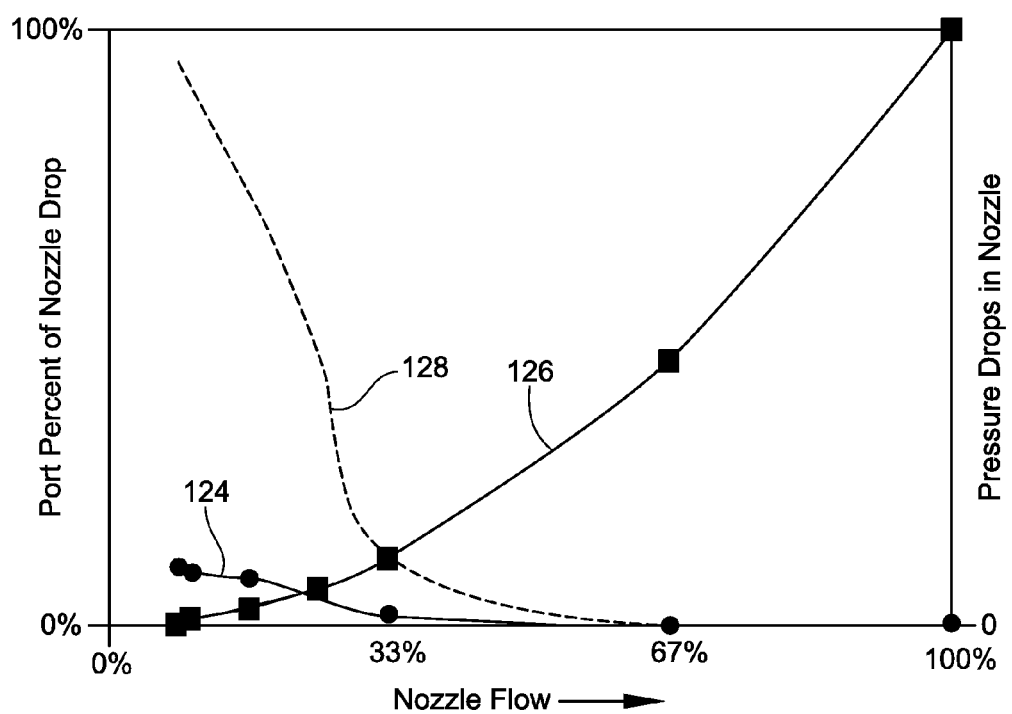
FIG. 2 is a graphical illustration of pressure drops of various orifices within the embodiment illustrated in FIG. 1.

Specifically and as discussed above, trace 121 of FIG. 6 shows the continual pressure drop of the metering port 115 of the conventional metering valve 103 over the entire flow range. Trace 124 of FIG. 2, quite advantageously, shows that the pressure drop of port 112 reduces as the flow increases. Indeed, trace 126 illustrates that, at high flow conditions, nearly the entire pressure drop of the nozzle 100 is due to the tip restriction 122 and the orifice 120. When this is compared to trace 123 of FIG. 6, and indeed when trace 128 of FIG. 2 is compared with trace 125 of FIG. 6, the advantage of the use of valve 102 in such a nozzle 100 of FIG. 1 are clear. Thus, the nozzle-to-nozzle variation in flow is dependent almost exclusively on the tip restriction 122 in combination with the orifice 120. Since the orifice 120 is calibrated in the exemplary environment of a nozzle 100 for a turbine engine, such variation can be minimized.

Figure 3:
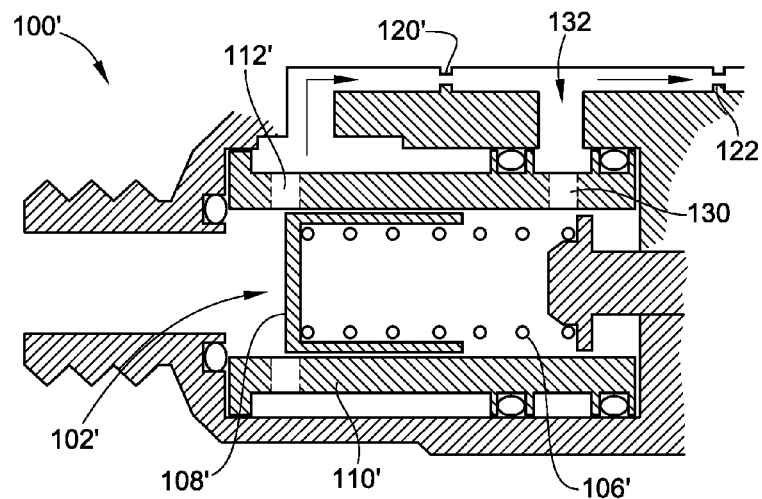
FIG. 3 is a functional schematic illustration of an alternate embodiment of a variable performance valve used in a fuel nozzle and constructed in accordance with the teachings of the present invention.

FIG. 3 illustrates an alternate embodiment of a variable performance valve 102' in a nozzle 100'. In this embodiment, the orifice 120' is positioned in parallel with the valve 102' and uses the downstream pressure of the orifice 120' to act on one side of the valve 102', i.e. on the opposite side of valving spool 108' on which the spring 106' also acts. In this embodiment, as the inlet pressure increases, the valve 102' begins to stroke, thereby opening port 112' to allow flow therethrough, and through the orifice 120' and the tip restriction 122. The flow also communicates through channel 132 and port 130 in the outer sleeve 110' to act on the opposite side of the valving spool 108' just indicated.

As with the embodiment of FIG. 1, initially almost all of the pressure drop is across the port 112'. However, as the open area of port 112' is increased due to increasing inlet pressure, the flow will increase. As the flow through the orifice 120' increases, a pressure drop develops across it. The pressure drop across the valve 102' is now a sum of the port 112' pressure drop and the orifice 120' pressure drop. Since the pressure drop across the valve 102' cannot be greater than the spring force divided by valve area, the valve 102' is forced to stroke open to reduce the port 112' pressure drop to compensate for increasing orifice 120' pressure drop that is communicated through channel 132 and port 130. As flow is further increased, the valve 102' will stroke all the way open (preferably to a positive stop) such that the pressure drop at the port 112' becomes negligible and the pressure drop across the orifice 120' approaches 100% of the pressure drop across the valve 102'.

Figure 4:
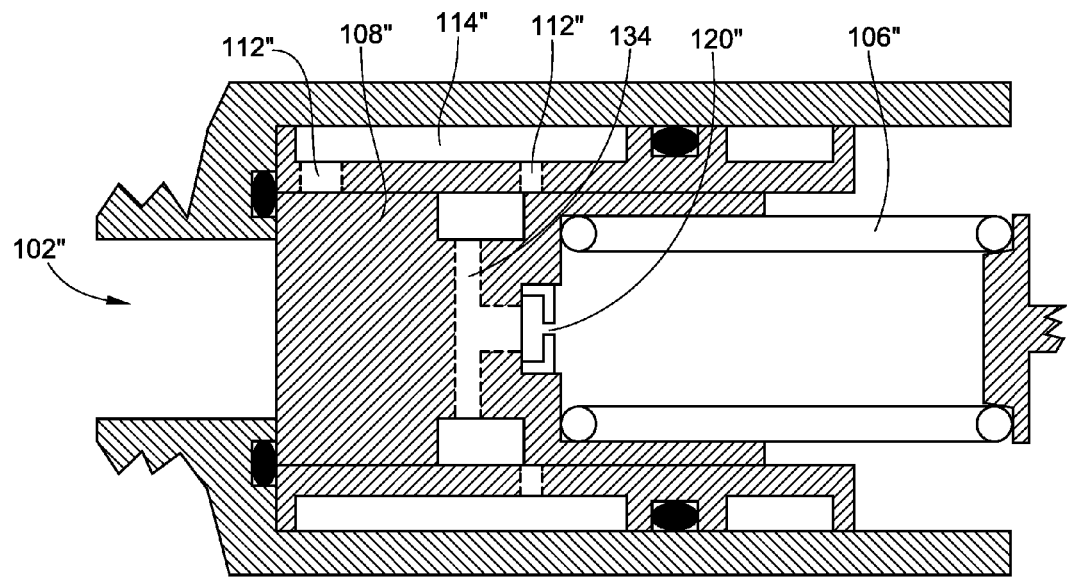
FIG. 4 is a cross sectional illustration of a further embodiment of a variable performance valve used in a fuel nozzle and constructed in accordance with the teachings of the present invention.

A further embodiment that incorporates the orifice 120" directly in the piston 108" of the valve 102", thus having all flow pass through the valve 102" on its axis, is shown in FIG. 4. Flow is communicated to the orifice 120" via port 134 once the valve 102" begins to stroke open. The pressure of the downstream side of the orifice 120" acts on the backside of the piston 108" to provide operation as discussed above.

As will now be apparent to those skilled in the art, other embodiments that make use of an additional pressure drop (not necessarily from a calibration orifice) are possible that result in the same valve function and operation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A variable performance valve for use in a fuel nozzle for a turbine engine, the fuel nozzle including a housing having a fuel inlet and an outlet having a tip restriction therein, the variable performance valve being positioned between the inlet and the tip restriction, comprising:
    an outer sleeve held in fixed relation to the housing, the outer sleeve including an annulus formed in an inner surface thereof,
    an inner spool slidably positioned in relation to the outer sleeve, the inner spool including a first port positioned not to be in communication with the annulus in a no flow state of the nozzle and to come into communication with the annulus as the inner spool is slidably repositioned relative to the outer sleeve, the inner spool further including a second port in communication with the annulus and a fuel manifold of the inner spool, the inner spool further including an orifice providing fluid communication between the fuel manifold and the outlet tip restriction, and
    a spring positioned to provide a bias force to position the inner spool to the no flow state whereby the first port is not in fluid communication with the annulus; and
    wherein the first port and the orifice are sized relative to one another such that at low flow conditions a pressure drop from the inlet to the tip restriction is approximately equal to a pressure drop across the first port, at intermediate flow conditions the pressure drop from the inlet to the tip restriction is a sum of the pressure drop across the first port and a pressure drop across the orifice, and at high flow conditions the pressure drop from the inlet to the tip restriction is approximately equal to the pressure drop across the orifice.

2. The variable performance valve of claim 1, wherein the pressure drop across the orifice acts on the inner spool such that the inner spool is pulled open.

3. The variable performance valve of claim 1, wherein the pressure drop across the orifice aids an inlet pressure in opposing the bias force of the spring.

4. The variable performance valve of claim 1, further comprising a seal positioned to check the flow in the no flow state.

5. The variable performance valve of claim 4, wherein the inner spool is held against the seal by the bias force until a threshold pressure at the fuel inlet is reached to thereby meter the flow.

6. The variable performance valve of claim 1, wherein the bias force acts on the inner spool during the low flow and intermediate flow conditions to thereby pressurize the flow.

7. The variable performance valve of claim 1, wherein the spring acts on the inner spool to vary an area of overlap between the first port and the annulus during the low flow and intermediate flow conditions.

8. The variable performance valve of claim 1, wherein the spring does not act on the inner spool to vary an area of overlap between the first port and the annulus during the high flow conditions.

9. A method of regulating fuel flow through a nozzle, comprising the step of providing the variable performance valve of claim 1 configured such that at low flow conditions a pressure drop across the valve is approximately equal to a pressure drop across a metering port, at intermediate flow conditions the pressure drop across the valve is a sum of the pressure drop across the metering port and a pressure drop across an orifice, and at high flow conditions the pressure drop across the valve is approximately equal to the pressure drop across the orifice.

10. The method of claim 9, further comprising the step of configuring the valve such that the pressure drop across the orifice pulls the valve open.

11. The method of claim 9, further comprising the step of configuring the valve such that the flow is checked when a pressure thereof is less than a bias force.

12. The method of claim 11, further comprising the step configuring the valve such that the bias force pressurizes the flow during the low flow and intermediate flow conditions.

* * * * *